US006842738B1

(12) United States Patent
Bradley et al.

(10) Patent No.: US 6,842,738 B1
(45) Date of Patent: Jan. 11, 2005

(54) SYSTEM AND METHOD FOR PROVIDING PROPERTY VALUE ESTIMATES

(75) Inventors: Michael G. Bradley, Potomac, MD (US); Douglas A. McManus, Bethesda, MD (US)

(73) Assignee: Freddie Mac, McLean, VA (US)

( * ) Notice: Subject to any disclaimer, the term of this patent is extended or adjusted under 35 U.S.C. 154(b) by 0 days.

(21) Appl. No.: 09/134,161

(22) Filed: Aug. 14, 1998

Related U.S. Application Data

(63) Continuation-in-part of application No. 08/730,289, filed on Oct. 11, 1996.
(60) Provisional application No. 60/056,196, filed on Aug. 21, 1997.

(51) Int. Cl.[7] .......................... G06F 17/60; G06F 17/00
(52) U.S. Cl. .............................. 705/10; 705/1; 705/400
(58) Field of Search ............................ 705/1, 35, 400, 705/36, 38, 37, 17, 18, 10; 706/17

(56) References Cited

U.S. PATENT DOCUMENTS

| | | | | | |
|---|---|---|---|---|---|
| 4,739,478 | A | * | 4/1988 | Roberts et al. | 705/36 |
| 4,876,648 | A | * | 10/1989 | Lloyd | 705/35 |
| 5,361,201 | A | * | 11/1994 | Jost et al. | 705/35 |
| 5,414,621 | A | * | 5/1995 | Hough | 705/10 |
| 5,680,305 | A | * | 10/1997 | Apgar, IV | 705/10 |
| 5,699,527 | A | * | 12/1997 | Davidson | 705/38 |
| 5,742,775 | A | * | 4/1998 | King | 705/38 |
| 5,774,883 | A | * | 6/1998 | Andersen et al. | 705/38 |
| 5,857,174 | A | * | 1/1999 | Dugan | 705/1 |
| 6,038,554 | A | * | 3/2000 | Vig | 705/400 |
| 6,115,694 | A | * | 9/2000 | Cheetham et al. | 705/10 |
| 6,141,648 | A | * | 10/2000 | Bonissone et al. | 705/10 |
| 6,178,406 | B1 | * | 1/2001 | Cheetham et al. | 705/10 |
| 6,401,070 | B1 | * | 6/2002 | McManus et al. | 705/1 |

FOREIGN PATENT DOCUMENTS

| | | | | |
|---|---|---|---|---|
| JP | 342251 | * 12/1996 | | |
| WO | WO95/12176 | * 5/1995 | ........... | G06F/17/60 |
| WO | WO96/36003 | * 11/1996 | ........... | G06F/17/30 |

OTHER PUBLICATIONS

Hoffman Thomas, Realtors may board up Internt site money pit pp 1–3, Aug. 1996.*
Schiller Park, Creating an industrail property database, pp 1–3, Jan. 1995.*
Ryan Susan, Superbase flies on strong multimedia current, pp 1–2, Dec. 1994.*
Jennifer a Nevitt, Uncovering the real market, pp 1–5, Sep. 1997.*
Multilingual Software figures replacement cost, pp 1–2, Aug. 1993.*
Heck Mike, Project Scheduler & cuts through enterprise strata, pp 1–2, Aug. 1996.*
Lima, R.J. et al, Designing a statewide real property inventory, pp 1–2, Jan. 1989.*
New Satellite Data Communications System, COMLINE, pp 1, Jan. 1989.*
1. Evaluation and Combination of Forecasts, Chapter 8.
2. Econometrics, G.S. Maddala, pp. 314–317 (1977).
3. Economic Forecasting: An Introduction 85–107 (1994).
4. Forecasting Economic Time Series 265–276 (2d ed., 1986).

* cited by examiner

*Primary Examiner*—James W. Myhre
(74) *Attorney, Agent, or Firm*—Finnegan, Henderson, Farabow, Garrett & Dunner, L.L.P.

(57) ABSTRACT

A system preprocesses property value estimates based on stored property data. It stores the computed property value estimates in a forecast data repository. The system obtains updates or new property data and computes new estimates according to a predetermined schedule. Users can instantaneously obtain property value estimates that have been preprocessed, thus eliminating a long wait period necessary for on-line processing.

56 Claims, 17 Drawing Sheets

| FIELD NAME 310 | TYPE 320 | LENGTH 330 | DETAILS/COMMENTS 340 |
|---|---|---|---|
| (LNNO) | CHAR | 24 | REQUIRED FOR SCRUBBER PROCESS |
| ADDRESS | CHAR | 50 | |
| SITE CITY STATE (excluding state) | CHAR | 20 | |
| STATE CODE | CHAR | 2 | |
| SITE ZIP | NUM | 5 | |
| SITE ZIP PLUS 4 | NUM | 4 | |
| (SCRUBBED ADDRESS) | CHAR | 50 | RESULT OF SCRUBBER PROCESS |
| (SCRUBBED CITY) | CHAR | 20 | RESULT OF SCRUBBER PROCESS |
| (SCRUBBED STATE) | CHAR | 2 | RESULT OF SCRUBBER PROCESS |
| (SCRUBBED ZIP) | NUM | 5 | RESULT OF SCRUBBER PROCESS |
| (SCRUBBED ZIP PLUS 4) | NUM | 4 | RESULT OF SCRUBBER PROCESS |
| (reserved for future use) | CHAR | 4 | POTENTIALLY FOR STORING ADDITIONAL RETURN CODES FROM SCRUBBER |
| (ADDRESS RETURN CODE) | CHAR | 1 | RESULT OF SCRUBBER PROCESS |
| (reserved for future use) | CHAR | 13 | POTENTIALLY FOR STORING ADDITIONAL PROCESS RESULTS INFORMATION FROM SCRUBBER |
| (SCRUBBED FIPS STATE CODE) | NUM | 2 | RESULT OF SCRUBBER PROCESS |
| (SCRUBBED FIPS COUNTY CODE) | NUM | 3 | RESULT OF SCRUBBER PROCESS |
| FIPS COUNTY CODE | NUM | 3 | |
| MUNICIPALITY CODE | CHAR | 2 | |
| PARCEL NUMBER | CHAR | 24 | |
| COMPANY NAME FLAG | CHAR | 1 | |
| SITE CARRIER ROUTE | CHAR | 4 | |
| SITE AND MAIL SAME | CHAR | 1 | |
| STANDARD USE CODE | CHAR | 4 | |
| ASSESSED VALUE | NUM | 9 | |
| VALUE PERCENT IMPROVEMENT | NUM | 4 | |
| HOMEOWNER EXEMPTION | CHAR | 1 | |
| TAX AMOUNT | NUM | 9 | |
| YEAR SOLD TO STATE | NUM | 4 | |
| LOT SIZE | NUM | 9 | |
| LOT WIDTH | NUM | 4 | |
| LOT DEPTH | NUM | 4 | |
| YEAR BUILT | NUM | 4 | |

*FIG. 3a*

| FIELD NAME 310 | TYPE 320 | LENGTH 330 | DETAILS/COMMENTS 340 |
|---|---|---|---|
| EFFECTIVE YEAR BUILT | NUM | 4 | |
| NUMBER OF UNITS | NUM | 4 | |
| NUMBER OF STORIES | NUM | 2 | |
| SQUARE FEET | NUM | 9 | |
| NUMBER OF BATHROOMS | NUM | 4 | |
| NUMBER OF BEDROOMS | NUM | 4 | |
| NUMBER OF ROOMS | NUM | 4 | |
| POOL FLAG | CHAR | 1 | |
| FIREPLACE FLAG | CHAR | 1 | |
| VIEW FLAG | CHAR | 1 | |
| GARAGE CARPORT | CHAR | 3 | |
| GARAGE SQUARE FEET | NUM | 4 | |
| HEATING COOLING | CHAR | 1 | |
| COOLING DETAIL | CHAR | 1 | |
| HEATING DETAIL | CHAR | 1 | |
| ROOF TYPE | CHAR | 1 | |
| CONSTRUCTION QUALITY | NUM | 3 | |
| CONSTRUCTION TYPE | CHAR | 1 | |
| BUILDING SHAPE | CHAR | 1 | |
| SQ FEET 1st FLOOR | NUM | 4 | |
| SQ FEET 2nd FLOOR | NUM | 4 | |
| SQ FEET 3rd FLOOR | NUM | 4 | |
| SQ FEET ADDITIONS | NUM | 4 | |
| SQ FEET BASEMENT | NUM | 4 | |
| LAST TRANSACTION DATE | NUM | 8 | |
| LAST TRANSACTION DOC NUMBER | CHAR | 10 | |
| SALE DATE | NUM | 8 | |
| SALE AMOUNT | NUM | 9 | |
| FULL OR PARTIAL | CHAR | 1 | |

FIG. 3b

| FIELD NAME 310 | TYPE 320 | LENGTH 330 | DETAILS/COMMENTS 340 |
|---|---|---|---|
| 1st LOAN AMOUNT | NUM | 9 | |
| 2nd LOAN AMOUNT | NUM | 9 | |
| LOAN TYPE | CHAR | 1 | |
| INTEREST RATE TYPE | CHAR | 1 | |
| TRANSACTION TYPE | CHAR | 1 | |
| DEED TYPE | CHAR | 1 | |
| MULTIPLE OR PORTION | CHAR | 1 | |
| LENDER NAME | CHAR | 30 | |
| TITLE COMPANY CODE | CHAR | 3 | |
| X COORDINATE | NUM | 9 | |
| Y COORDINATE | NUM | 8 | |
| CENSUS TRACT | CHAR | 6 | |
| CENSUS BLOCK GROUP | CHAR | 1 | |
| GEO QUALITY CODE | NUM | 2 | |
| ZONING | CHAR | 4 | |
| TRACT NUMBER | NUM | 7 | |
| BLOCK NUMBER | CHAR | 5 | |
| LOT NUMBER | CHAR | 5 | |
| RANGE | CHAR | 3 | |
| TOWNSHIP | CHAR | 3 | |
| SECTION | CHAR | 2 | |
| QUARTER | CHAR | 2 | |
| PREVIOUS SALE DATE | NUM | 8 | |
| PREVIOUS SALE AMOUNT | NUM | 9 | |
| PREVIOUS FULL OR PARTIAL | CHAR | 1 | |
| DATE RECORD ERROR INDICATOR | CHAR | 1 | |
| Total Record Length | | 534 | |

FIG. 3c

| KEY 410 | FIELD NAME 420 | TYPE 430 | LENGTH 440 | COMMENTS/VALUE RANGE 450 |
|---|---|---|---|---|
| X | FRD-HIST-ZIP | NUM | 5 | |
| | FRD-HIST-ADDRESS | CHAR | 50 | |
| | FRD-HIST-REFI-FLAG | CHAR | 1 | |
| | FRD-HIST-STD-USE-CODE | CHAR | 4 | |
| | FRD-HIST-STATE-CODE | CHAR | 2 | |
| | FRD-HIST-FIPS-COUNTY CODE | NUM | 3 | |
| | FRD-HIST-MUNICIPALITY-CODE | CHAR | 2 | |
| X | FRD-HIST-WHOLE-DATE | | 0 | |
| | FRD-HIST-CENTURY | NUM | 2 | |
| | FRD-HIST-TRANSFER-DATE | NUM | 6 | YYMMDD FORMAT |
| | FRD-HIST-DOCUMENT-NUMBER | CHAR | 10 | |
| | FRD-HIST-PARCEL-NUMBER | CHAR | 24 | |
| | FRD-HIST-TRANSACTION-TYPE | CHAR | 1 | C=construction loan/L=Refi\equity/S=division sale/T=timeshare sale/R=resale |
| X | FRD-HIST-TRANSFER-VALUE | NUM | 9 | |
| | FRD-HIST-1ST-LOAN-AMT | NUM | 9 | |
| X | FRD-HIST-2ND-LOAN-AMT | NUM | 9 | |
| | FRD-HIST-FULL-OR-PART | CHAR | 1 | F=full valued sale/P=partially valued |
| | FRD-HIST-MULTI-OR-PORT | CHAR | 1 | M=multiple properties involved in sale/P=portion of parcel is sold |
| | FRD-HIST-LOAN-TYPE | CHAR | 1 | F=FHA/V=VA/or blank=conventional |
| | FRD-HIST-INT-RATE-TYPE | CHAR | 1 | V=variable rate/F=fixed/other |
| | FRD-HIST-BUYER | CHAR | 32 | |
| | FRD-HIST-SELLER | CHAR | 32 | |
| | FRD-HIST-LENDER | CHAR | 30 | |
| | FRD-HIST-DEED-TYPE | CHAR | 1 | Q=quit claim/T=trustee's sale/or blank=grant/trust |
| | FRD-HIST-TITLE-COMPANY-CODE | CHAR | 4 | |
| | *Total Record Length* | | 240 | |

PROVIDER X INFORMATION NETWORK

WELCOME
TO
HOME VALUE ESTIMATOR (LEGAL DISCLAIMER)

ENTER '!' AT ANY PROMPT TO RETURN TO DATABASE MENU

ENTER 'Y' TO CONTINUE OR 'N' TO EXIT TO DATABASE MENU> Y

510

PROVIDER X INFORMATION NETWORK
======12/31/97======DATABASE MENU======2:30 PM======

A  REAL ESTATE DATA                 J  WESTERN FLOOD DATA
B  STATEWIDE SEARCHES               K  FORECLOSURE DATA
C  TITLE PLANT ACCESS               L  PROPERTY HISTORY/DOC # SEARCH
D  VERIFACTS                        M  ERHSCORE REPORT
E  BUSINESSLINK                     N  NATIONAL NEW BUSINESS HOT LIST
F  COMPS                            O  DEMOGRAPHIC/TREND REPORT
G  NEW HOMES/NEW OWNERS             P  DEMOGRAPHIC MARKETING SYSTEM
H  CMDC (MEMBERS ONLY)              R  NATIONAL PROPERTY RECORDS
I  MORTGAGE LEADS                   S  HOME VALUE ESTIMATOR

HELP 2400bd, ETC.                3  PROVIDER X SOFTWARE & FAX
END SESSION                          4  PRICING & ACCOUNTING INFO

NOTE: FOR DETAILED DATABASE INFORMATION, CHOOSE OPTION #1

ENTER OPTION > S

530

ENTER PREPARED FOR NAME          ^^^^^^^^^^^^^^^^^^^^
ENTER PREPARED BY NAME (20 CHARS) ^^^^^^^^^^^^^^^^^^^^
ENTER LOAN #                     ^^^^^^^^^^^^^^^^
ENTER JOB ID                     ^^^^^^^^
ENTER ZIP CODE                   ^^^^^
ENTER HOUSE NUMBER               ^^^^^^
ENTER STREET NAME                ^^^^^^^^^^^^^^^^^^^^
ENTER UNIT NUMBER                ^^^^
ENTER CITY NAME                  ^^^^^^^^^^^^^^^^
ENTER PURCHASE PRICE             ^^^^^^^
ENTER PURCHASE DATE              ^^^^^^
ENTER PROPERTY TYPE              ^

(PROPERTY TYPES: 1 SINGLE FAMILY DWELLING / 2 CONDO)

| PROPERTY INFORMATION | ADDRESS: | 123 MAIN STREET | FAIRFAX, VA. 22032 |
|---|---|---|---|
| | LOW | POINT | HIGH |
| ESTIMATES OF VALUE: | $100,000 | $120,000 | $140,000 |
| MODEL TYPE (RS / H /COMBO): C | | | |

PROPERTY PRICE TREND

[Graph showing property price trend over time series 0–15, with Y-axis 100000–140000. Legend: X PROPERTY, ---- ZIP, ―― COUNTY]

RECENT SALE DATA

| ADDRESS | SALE DATE | PRICE | LIVING AREA | LOT SIZE | BED | BATH |
|---|---|---|---|---|---|---|
| 105 MAIN STREET | OCT-97 | $100,000 | 1980 SQ.FT. | 4800 SQ.FT. | 3 | \ 2.5 |
| COMPARABLE 10 | AUG-97 | $130,000 | 2250 SQ.FT. | 5100 SQ.FT. | 4 | \ 3 |
| 210 APPLE STREET | JUN-97 | $125,000 | 2100 SQ.FT. | 5000 SQ.FT. | 4 | \ 2.5 |
| COMPARABLE 20 | SEP-97 | $118,000 | 2000 SQ.FT. | 5000 SQ.FT. | 4 | \ 2 |

AREA MAP

123 MAIN STREET FAIRFAX, VA. 22032

[Map of area showing Gettysburg Dr, Northern Railroad, New Guinea Rd, with compass directions NW, NORTH, NE, WEST, EAST, SW, SOUTH, SE; DAY/NIGHT and SMALL (400 x 250)/LARGE (600 x 175) options; ZOOM OUT / ZOOM IN controls]

| VARIABLE | TYPE | LEN | DESCRIPTION |
|---|---|---|---|
| ADDRESS | CHAR | 50 | PROPERTY ADDRESS |
| AGENCY | CHAR | 1 | INDICATOR OF DATA SOURCE (A=FANNIE MAE/B=FREDDIT MAC/C=DATA PROVIDER) |
| FIPS_CO | NUM | 8 | FIPS COUNTY CODE |
| LNNO | CHAR | 10 | FREDDIE MAC LOAN NUMBER (IF FM DATA) |
| NTORGDTE | NUM | 8 | ORIGINATION DATE OF THE LATEST PRIMARY LOAN |
| REFIFLG | CHAR | 1 | INDICATOR OF WHETHER LOAN IS A RESULT OF REFINANCING (C=CASHOUT/N=NO/R=NON-CASHOUT/OR BLANK=UNKNOWN) |
| STATE | CHAR | 2 | TWO LETTER STATE CODE |
| TRACT | NUM | 8 | TRACT/LOT INFORMATION OF PROPERTY |
| VALUE | NUM | 8 | SEED VALUE |
| ZIPCODE | NUM | 8 | PROPERTY'S ZIP CODE - WILL BECOME $CHAR5 |

1020

| VARIABLE | TYPE | LEN | POS | DESCRIPTION |
|---|---|---|---|---|
| ADDRESS | CHAR | 30 | 0 | INPUT ADDRESS |
| AGENCY 1 | CHAR | 1 | 30 | INDICATOR OF DATA SOURCE (A=FANNIE MAE/B=FREDDIE MAC/C=DATA PROVIDER) |
| AGENCY 2 | CHAR | 1 | 31 | INDICATOR OF DATA SOURCE (A=FANNIE MAE/B=FREDDIE MAC/C=DATA PROVIDER) |
| ZIP_CODE | CHAR | 8 | 32 | INPUT ZIP - WILL BECOME $CHAR5 |
| ORIGVAL1 | NUM | 8 | 40 | VALUE OF FIRST TRANS |
| ORIGVAL2 | NUM | 8 | 48 | VALUE OF SECOND TRANSACTION |
| STATE | CHAR | 2 | 56 | INPUT STATE |
| ORIGDTE1 | NUM | 8 | 58 | ORIG DATE OF FIRST TRANS |
| ORIGDTE2 | NUM | 8 | 66 | ORIG DATE OF SECOND TRANS |
| REFIFLG1 | CHAR | 1 | 74 | INDICATOR OF WHETHER FIRST LOAN IS A RESULT OF REFINANCING (C=CASHOUT/N=NO/R=NON-CASHOUT/OR BLANK=UNKNOWN) |
| REFIFLG2 | CHAR | 1 | 75 | INDICATOR OF WHETHER FIRST LOAN IS A RESULT OF REFINANCING (C=CASHOUT/N=NO/R=NON-CASHOUT/OR BLANK=UNKNOWN) |
| LNNO1 | CHAR | 10 | 76 | LNNO OF TRANSACTION #1 |
| LNNO2 | CHAR | 10 | 86 | LNNO OF TRANSACTION #2 |

| VARIABLE | TYPE | LEN | POS | DESCRIPTION |
|---|---|---|---|---|
| ADDR_ | CHAR | 50 | 96 | OUTPUT ADDRESS |
| STATE_ | CHAR | 2 | 146 | OUTPUT STATE |
| ZIP_ | CHAR | 5 | 148 | OUTPUT ZIP |
| FIPS_CO | NUM | 8 | 153 | |
| TRACT | NUM | 8 | 161 | |
| MSA | CHAR | 4 | 169 | |
| PLACE | NUM | 8 | 173 | |
| CMSA | CHAR | 2 | 181 | |

*FIG. 10 (CONT.)*

GRT BY ZIP CODE
1210

| VARIABLE | TYPE | LEN | DESCRIPTION |
|---|---|---|---|
| ZIP | CHAR | 5 | CHARACTER USPS ZIP CODE |
| T1 | NUM | 8 | DISPLACEMENT IN QUARTERS FROM 1975 Q1 |
| PCFORSDN | NUM | 8 | NEG. FORECAST STD. DEV. FOR CO PROP W/PURE SEED |
| PCFORSDP | NUM | 8 | POS. FORECAST STD. DEV. FOR CO PROP W/PURE SEED |
| PC_GROWR | NUM | 8 | GROWTH MULTIPLIER FOR CO PROP W/REFI SEED |
| RCFORSDN | NUM | 8 | NEG. FORECAST STD. DEV. FOR SF PROP W/REFI SEED |
| PSFORSDP | NUM | 8 | POS. FORECAST STD. DEV. FOR SF PROP W/PURE SEED |
| PS_GROWR | NUM | 8 | GROWTH MULTIPLIER FOR SF PROPERTY W/REFI SEED |
| RCFORSDN | NUM | 8 | NEG. FORECAST STD. DEV. FOR CO PROP W/REFI SEED |
| RCFORSDP | NUM | 8 | POS. FORECAST STD. DEV. FOR CO PROP W/REFI SEED |
| RC_GROWR | NUM | 8 | GROWTH MULTIPLIER FOR CO PROPERTY W/REFI SEED |
| RSFORSDN | NUM | 8 | NEG. FORECAST STD. DEV. FOR SF PROP W/REFI SEED |
| RSFORSDP | NUM | 8 | POS. FORECAST STD. DEV. FOR SF PROP W/REFI SEED |
| RS GROWR | NUM | 8 | GROWTH MULTIPLIER FOR SF PROP W/REFI SEED |
| SOURCE | CHAR | 4 | LABELS INDEX SOURCE ("CNTY" OR "ZIP") |

GRT BY COUNTY
1220

| VARIABLE | TYPE | LEN | DESCRIPTION |
|---|---|---|---|
| STATE | CHAR | 2 | TWO LETTER STATE CODE |
| COUNTY | NUM | 8 | FIPS COUNTY CODE |
| T1 | NUM | 8 | DISPLACEMENT IN QUARTERS FROM 1975 Q1 |
| REFI1 | NUM | 8 | 0-1 INDICATOR OF REFI SEED SOURCE |
| COND_FLG | NUM | 8 | 0-1 INDICATOR OF CONDOMINIUM PROPERTY |
| GROWR | NUM | 8 | GROWTH MULTIPLIER |
| FORSDN | NUM | 8 | NEGATIVE FORECAST STANDARD DEVIATION |
| FORSDP | NUM | 8 | POSITIVE FORECAST STANDARD DEVIATION |
| SOURCE | CHAR | 4 | LABELS INDEX SOURCE ("CNTY" OR "COND" 0) |
| PERIOD | CHAR | 5 | INDEX PERIOD IN FORMAT Qyy0q (THIS WILL CHANGE FOR Y2K) |
| PER_FOR | CHAR | 5 | TARGET QUARTER FOR FORECASTS IN FORMAT Qyy0q (NORMALLY THE CURRENT QTR.) |

| VARIABLE | TYPE | LEN | DESCRIPTION |
|---|---|---|---|
| STATE CODE | CHAR | 2 | TWO LETTER STATE CODE |
| FIPS COUNTY CODE | NUM | 3 | FIPS COUNTY CODE |
| PARCEL NUMBER | CHAR | 24 | TAX ASSESSOR PROPERTY REFERENCE NUMBER |
| ZIP | NUM | 5 | CHARACTER USPS ZIP CODE |
| ADDRESS | CHAR | 50 | PROPERTY ADDRESS |
| REPEAT SALES (RS) FORECAST | NUM | 9.0 | MEAN PROPERTY VALUE ESTIMATE |
| RS LOWER 80% BOUND | NUM | 9.0 | LOWER BOUND OF PROPERTY VALUE ESTIMATE |
| RS UPPER 80% BOUND | NUM | 9.0 | UPPER BOUND OF PROPERTY VALUE ESTIMATE |
| HEDONIC (HD) FORECAST | NUM | 9.0 | MEAN PROPERTY VALUE ESTIMATE |
| HD LOWER 80% BOUND | NUM | 9.0 | LOWER BOUND OF PROPERTY VALUE ESTIMATE |
| HD UPPER 80% BOUND | NUM | 9.0 | UPPER BOUND OF PROPERTY VALUE ESTIMATE |
| LOAN PROSPECTOR (LP) FORECAST | NUM | 9.0 | MEAN PROPERTY VALUE ESTIMATE |
| LP LOWER 80% BOUND | NUM | 9.0 | LOWER BOUND OF PROPERTY VALUE ESTIMATE |
| LP UPPER 80% BOUND | NUM | 9.0 | UPPER BOUND OF PROPERTY VALUE ESTIMATE |
| LP FORECAST STANDARD DEVIATION | NUM | 5.3 | STANDARD DEVIATION OF THE LP PROPERTY VALUE ESTIMATE |

*FIG.13*

SYSTEM AND METHOD FOR PROVIDING PROPERTY VALUE ESTIMATES

RELATED APPLICATIONS

This application is based on a provisional application, Ser. No. 60/056,196 filed on Aug. 21, 1997, the contents of which are hereby incorporated by reference. This application is also a continuation-in-part of U.S. patent application, Ser. No. 08/730,289 entitled METHOD FOR COMBINING HOUSE PRICE FORECASTS, filed Oct. 11, 1996, which is hereby incorporated by reference.

BACKGROUND OF THE INVENTION

The present invention relates generally to estimating property values, and more particularly, to providing preprocessed property value estimates.

Financial institutions and businesses involved with sales of property have long tried to estimate values of property accurately. Accurate estimation serves many important purposes. For example, financial institutions use property value estimates as one of the key factors in approving mortgage applications for real estate sales. Relying on the soundness of the estimate, financial institutions accept the risk of lending large sums of money and typically attach the property as security for the transaction. Accordingly, the accuracy of estimated value of the real estate entity is critical.

In addition to the accuracy of the estimate, timeliness is a significant factor. For example, a closing on a real estate sales contract may depend on the buyer successfully obtaining a loan within a limited time period. Also, the ability to evaluate the value of a large number of properties in a short time frame is a business necessity. Bids on pools of seasoned loans, for example, are due in a very tight timeframe and require collateral evaluation. Hence, the ability to estimate the value of the real estate entity quickly is very important to lenders and prospective buyers.

According to current industry practice, an estimate for a particular property is produced by a system in real-time, but this poses many problems. For one, the process is slow, especially for processing bulk transmissions. The system also needs to validate the address of the property to be estimated to ensure that the input address is indeed a valid address. For example, the system may check against an existing database to determine whether the input address contains a valid zip code or whether a combination of city and state fields of the input address matches the zip code of the input address. Moreover, real-time processing is subject to unpredictable conditions such as availability of properly running equipment, appraiser availability, and scheduling conflicts, whenever estimates are necessary. Further, a system computes an estimate for a property each time a request is submitted, even for properties that have been previously computed. Such redundancy wastes processing time and resources, results in repeated data entry, and increases the cost of the property valuations.

Furthermore, in existing systems, the platform providing the valuation estimates also needs access to "raw" bases. For example, the Hedonic model requires the capture of property level characteristic data and transaction value data to provide an estimate. This may involve either the use of large amounts of electronic data storage devices or connectivity with other systems, such as a data provider's system, which results in either additional cost and/or a reduction of reliability. In the case of the repeat sales model, after the growth rate table is created it is applied to the "seed value data set" to create, the forecasts.

Therefore, it is desirable to increase efficiency of property value forecasts by streamlining the forecasting process.

It is also desirable to provide a timely and reliable estimate of value.

SUMMARY OF THE INVENTION

Systems and method consistent with the present invention provide timely and accurate property value estimates by preprocessing the estimates and storing them for later access.

Specifically, a method consistent with the present invention of providing preprocessed property value estimates comprises several steps. Initially, the system accesses stored property data. The system then computes a property value estimates of the accessed property data. Thereafter, the system stores the computed property value estimates in a forecast data repository.

A system consistent with the present invention for providing preprocessed property value estimates includes accessing means, computing means, and storing means. The accessing means accesses stored property data with which the computing means computes a property value estimates of the retrieved property data. Thereafter, the storing means stores the computed property value estimates in a forecast data repository.

BRIEF DESCRIPTION OF THE DRAWINGS

The accompanying drawings, which are incorporated in and constitute a part of this specification, illustrate the invention and together with the description, serve to explain the principles of the invention.

In the drawings,

FIGS. 3a–3c illustrate a sample format of the property data used in Hedonic model estimation;

FIG. 4 illustrates a sample format of the sales transaction data;

FIG. 5 shows three sample input screens of a user terminal;

FIG. 6 shows a sample output screen of a user terminal;

FIG. 10 shows a sample layout of the fields contained in seed value file and repeat sales file;

FIG. 12 illustrates a sample layout of growth rate tables by zip code and by county;

FIG. 13 shows a table illustrating representative fields of the records stored in a forecast data repository.

DESCRIPTION OF THE PREFERRED EMBODIMENT

Figure 1:
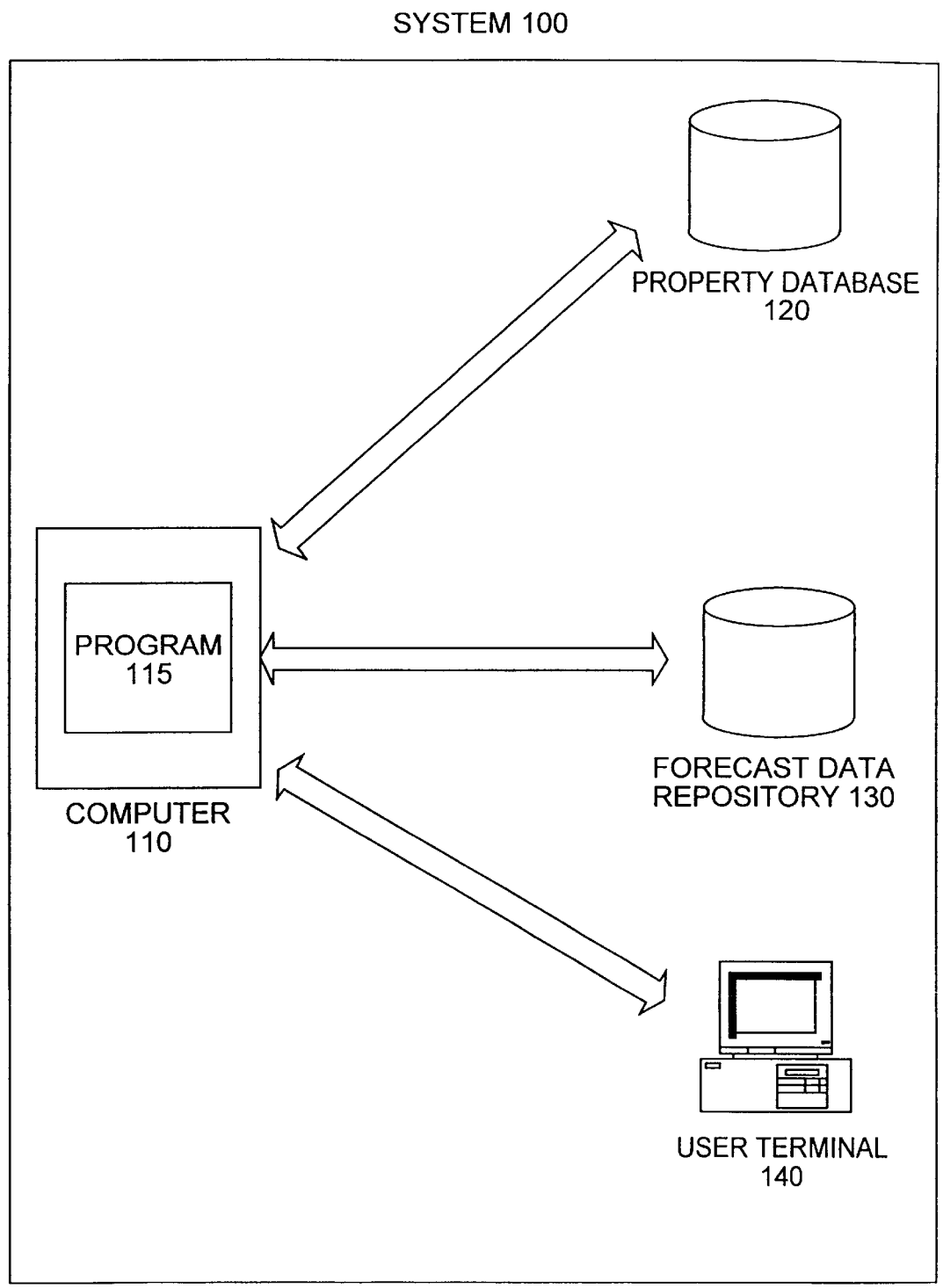
FIG. 1 shows a property value estimation system consistent with one embodiment of the present invention.

Reference will now be made in detail to the present preferred embodiment of the invention, an example of which is illustrated in the accompanying drawings. Where appropriate, the same reference numerals refer to the same or similar elements. The appended claims define the scope of the invention; the following description does not limit that scope.

FIG. 1 shows a property value estimation system 100 consistent with the present invention. System 100 includes a computer 110, a property database 120, a forecast data repository 130, and a user terminal 140. In one embodiment consistent with the present invention, computer 110 includes a mainframe for managing the property data and a UNIX machine for processing the property data to compute property value estimates. The mainframe may be an Amdahl processor primarily using tape storage in addition to having approximately 10 Gb of DASD (Direct Access Storage Device). The UNIX-specific instructions may be executed on a Sun SPARC® 1000e with the Solaris®2.5.1 operating system, three system boards, six CPUs, 768 Mb of memory, and 306 Gb of disk space. One skilled in the art may, however, use any computing system with adequate processing and memory capabilities.

A program 115 controls the overall process of computer 110 and may be written using such tools as COBOL II, SAS, and IBM utilities (Syncsort, JCL, FTP, etc.). To perform some standard functions, program 115 may use various commercial software such as Group 1 (Code 1 Plus v1.5 and Demographics v2.7), MathSoft (S-Plus v3.4), and the SAS Institute (mainframe and UNIX v6.12). The use of these programs will be explained in detail below.

Unlike previous systems that computed property value estimates on-line, system 100 offers an efficient and flexible way of providing property value estimates. System 100 provides a collection of preprocessed property value estimates, which can be accessed to retrieve estimates of a property quickly. Program 115 can compute the property value estimates using any one or a combination of methods.

Figure 2:
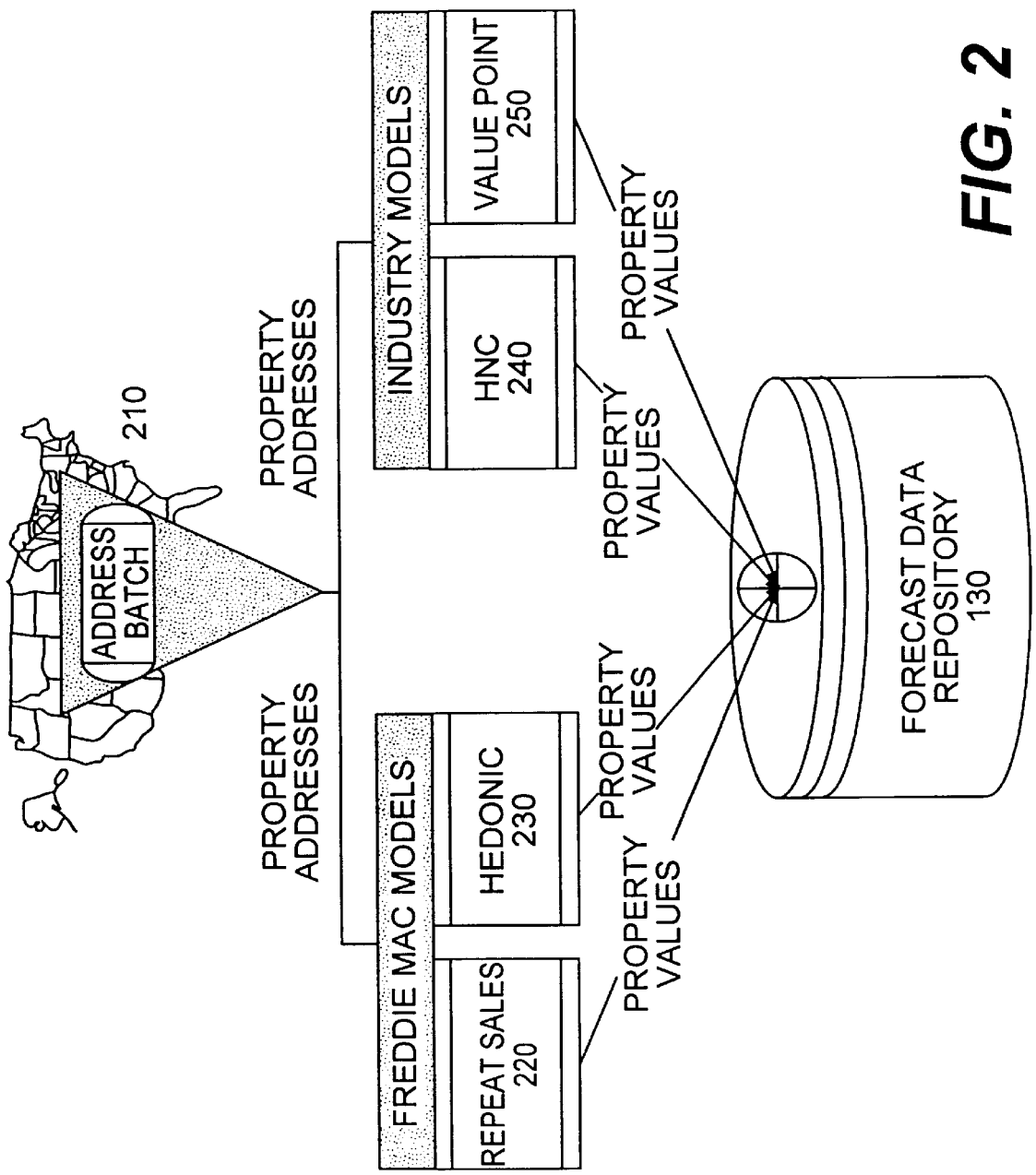
FIG. 2 shows a schematic overview for creation of the forecast data repository consistent with one embodiment of the present invention.

FIG. 2 shows a schematic overview of one embodiment consistent with the present invention. System 100 first accesses an address batch 210 representing property data of a portion or the entire country stored in property database 120, and provides the property addresses and related data for various statistical models.

In one embodiment consistent with the present invention, program 115 computes the estimate of property values using two statistical models, i.e., Repeat Sales model 220 and Hedonic model 230, and combines the results to produce the best estimate. Other models such as HNC model 240 and Value Point model 250 can also be used to compute the property value estimates. An example of combining results of the statistical models is provided in the above-referenced related application Ser. No. 08/730,289 For explanatory purposes, the described embodiment will combine the property value estimates of Repeat Sales model 220 and Hedonic model 230. One skilled in the art may use any one or a combination of methods without departing from the spirit of this invention. Regardless of what model or a combination of models are used, the property value estimates are stored in forecast data repository 130 for later retrieval. One skilled in the art may also design a system to store the property value estimates in database 120, which stores the property data.

Property database 120 stores data representing address batch 210 including property data and sales transaction data for use in computing the property value 20 estimate. A property data table 300 of FIGS. 3a–3c illustrate a sample format of the property data. Property data table 300 is composed of a field name column 310 containing address and county information, type column 320 indicating whether the field name contains alphabetic characters or numbers, length column 330 indicating the size of the field, and details/comments column 340.

A sales transaction, data table 400 of FIG. 4 illustrates a sample format of the sales transaction data including a key column 410, a field name column 420, a type column 430, a length column 440, and a comments/value range column 450. Key column 410 indicates with a check mark whether program 115 can sort the records based on the corresponding field name. The property data can be created by entities maintaining system 100 or obtained from commercial data providers such as DataQuick according to a predetermined schedule. In one embodiment consistent with the present invention, system 100 receives property data on a monthly basis from the data provider, typically on tape drives. System 100 stores the property data in property database 120 and updates the property data according to a predetermined schedule, e.g., every three months, to computer 110. One skilled in the art may easily vary the frequency and the period of the predetermined schedule at any time. For example, the predetermined schedule may be based on a time period or an occurrence of a certain event. In another embodiment consistent with the present invention, system 100 uploads the property data to computer 110 on a monthly basis as new property data files are received. One skilled in the art may, however, easily modify the frequency of data updates and the storage location.

Forecast data repository 130 contains property value estimates for each property stored in property database 120. As will be explained in detail below, program 115 may compute the property value estimates using a single statistical model or a combination of models. Computer 110 can also periodically update property value estimates, for example, every three months or whenever the property data is updated.

User terminal 140 can be a dummy terminal or a personal computer connected to computer 110. Through user terminal 140, users can access preprocessed property value estimates for any given property. For example, FIG. 5 shows three sample screens of user terminal 140. An initial screen 510 presents a menu of options the user can choose from. If the user selects option "S" to initiate the Home Value Estimator, for example, user terminal 140 presents a greeting screen 520 that welcomes the user and gives an option to continue or exit to the main menu. If the user enters "Y" to continue, user terminal 140 presents a data entry screen 530 requesting information or address of property for which the user would like an estimate. Thereafter, computer 110 accesses forecast data repository 130 to obtain the property value estimate corresponding to the data entered by the user.

FIG. 6 shows a sample output screen containing data such as property ID information, property value estimate, price trend, recent sale data, and area map. One skilled in the art may, however, easily modify the input and output screens.

As mentioned above, the described embodiment will be explained in detail assuming system 100 combines the results of Repeat Sales model 220 and Hedonic model 230 for computing the property value estimates. Also for explanatory purposes, system 100 updates property database 120 and computes new estimates on three-month cycles.

Figure 7:
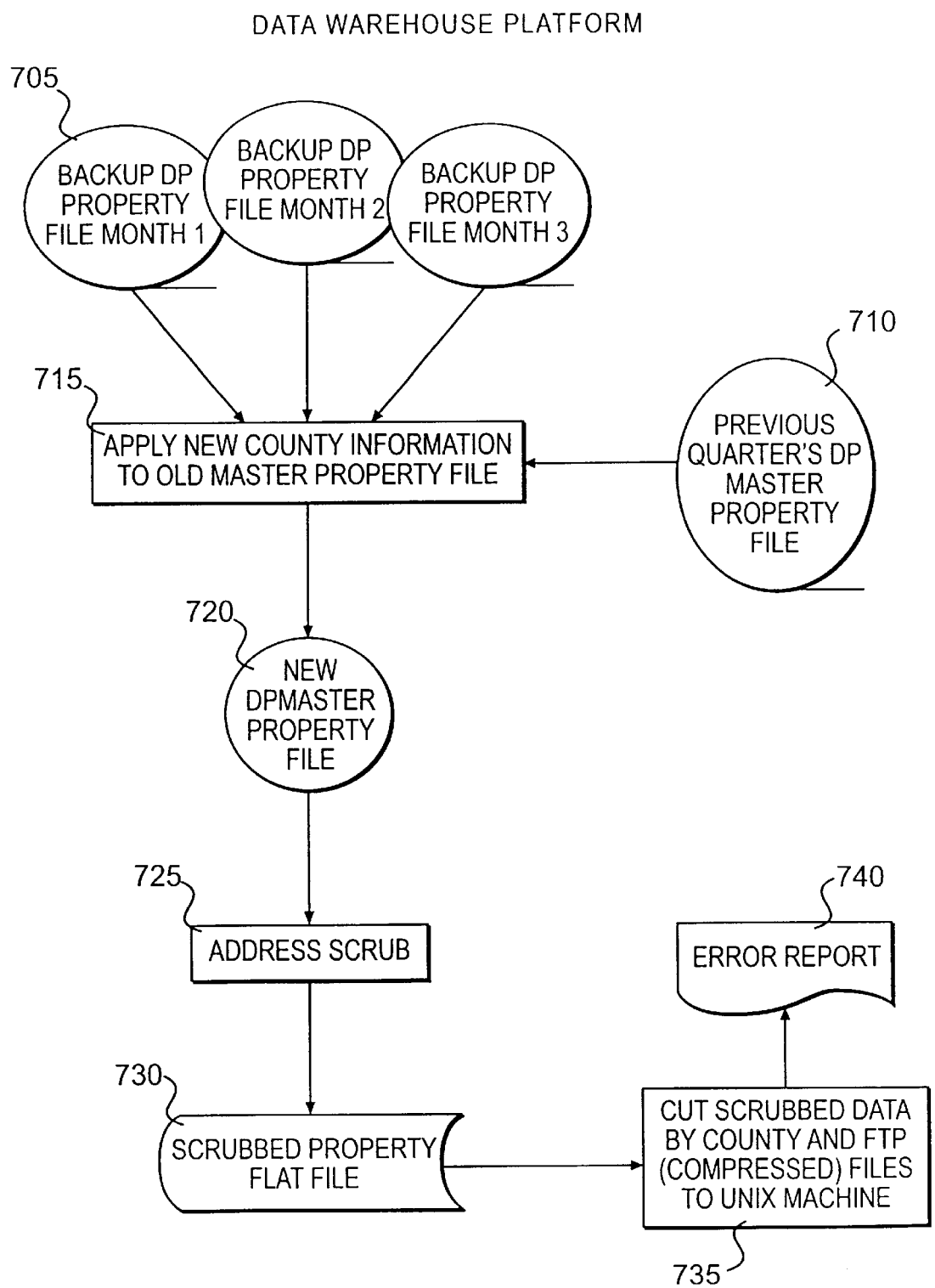
FIG. 7 is a flowchart illustrating the process for creating a new master property file for a Hedonic model.
Figure 8:
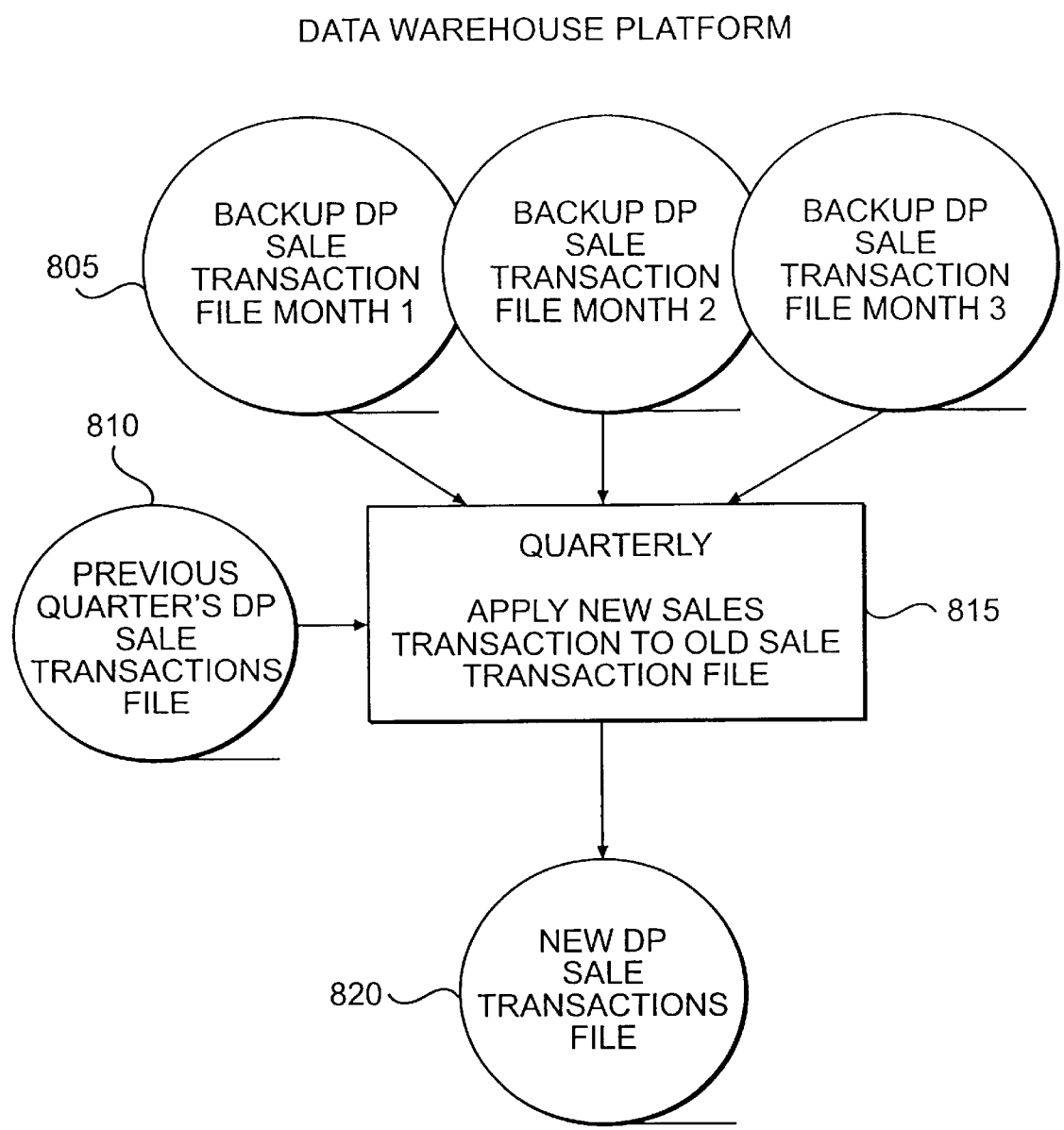
FIG. 8 is a flowchart illustrating the process for creating a new master sales transaction file for a Repeat Sales model.

FIGS. 7 and 8 illustrate processes, preferably performed by the mainframe portion of computer 110, relating to a data warehouse platform. Specifically, FIG. 7 is a flowchart illustrating the process for creating a new master property file for Hedonic model 220. Initially, program 115 retrieves and consolidates backup DP (data provider) files for months 1, 2, and 3 stored in property database 120 (step 705). Program 115 also copies into memory the previous quarter's master property file, which program 115 used for computing previous quarter's property value estimates (step 710). Program 115 then identifies counties contained in the new property file and replaces the existing property data for each county with the updates (step 715), thus creating a new DP master property file (step 720).

Program 115 then "scrubs" addresses for each record in the new master property file to obtain a standardized version of each property address (step 725). During the scrubbing process, program 115 may use commercial software, such as Group 1's Code 1 Plus and Demographic Coding System. Program 115 inserts the scrubbed address information in a corresponding field of property data table 300. These steps are repeated until program 115 reaches the end of the master property file. Program 115 thus produces a scrubbed property flat file (step 730).

To accommodate the process of Hedonic model 230, program 115 cuts the single large scrubbed property flat file into smaller county-specific files (step 735). Specifically, program 115 reads the scrubbed property flat file and creates a county-specific version of the flat file for each unique county encountered. Program 115 repeats these steps until it reaches the end of the scrubbed property flat file. Program 115 then transfers the resultant county-specific versions of the scrubbed property flat file to the UNIX portion of computer 115 where model processing will occur. A commercial package, such as File Transfer Protocol "FTP" utility by IBM, may be used to transfer the file. If program 115 encounters any errors during the cutting, scrubbing, or FTP process, program 115 generates an error report (step 740).

FIG. 8 is a flowchart illustrating the process for creating a new master property file, preferably performed by the mainframe portion of computer 110, for Repeat Sales model 220. The processes similar to that of one shown in FIG. 7. Initially, program 115 retrieves and consolidates sales transaction files for months 1, 2, and 3 stored in property database 120 (step 805). Program 115 also copies into memory previous quarter's sales transactions file, which program 115 used for computing previous quarter's property value estimates (step 810). Program 115 then identifies and appends any new sales to an existing property record in sales transaction data table 400 (step 815). These steps are repeated for each property record until program 115 reaches the end of the sales transaction file, thus creating a new sales transactions file (step 820).

Figure 9:
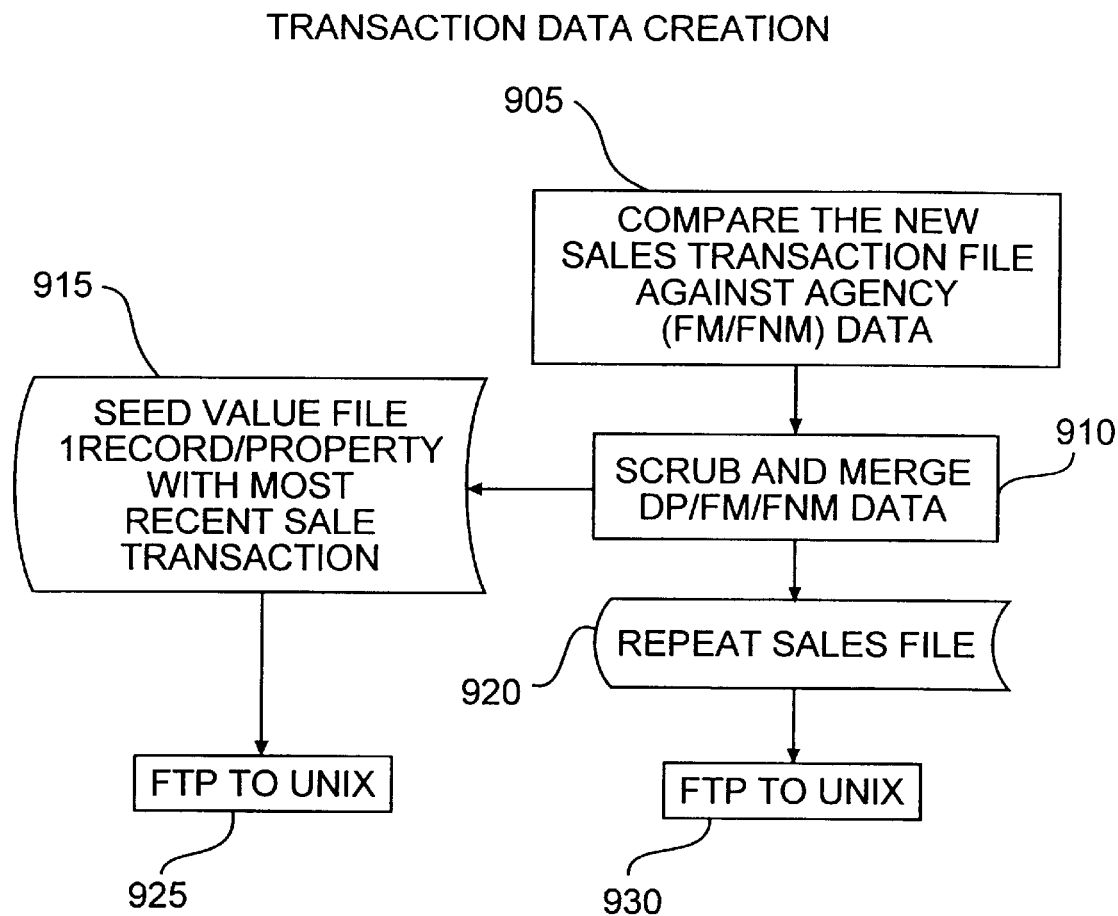
FIG. 9 is a flowchart illustrating transaction data creation performed for a Repeat Sales model.

FIG. 9 is a flowchart illustrating transaction data creation performed for Repeat Sales model 210. In general, the process of FIG. 9 identifies redundancies between the data provider, and loan agency data, e.g., FM/FNM (Freddie Mac and Fannie Mae), to create the most accurate record for a given property. To do so, program 115 compares the new sales transaction file against agency data to identify and resolve data redundancies (step 905). Program 115 then scrubs the addresses contained within the file and merges the unique agency and data provider data to create a larger temporary sales transaction file (step 910). As mentioned above, scrubbing may be performed using commercial software such as Group 1's Code-1 Plus and Demographics Coding System. From the temporary sales transaction file, program 115 generates two separate output files: seed value file containing most current sales price (step 915) and repeat sales file containing the scrubbed property address with all repeat sales transactions (step 920). Tables 1010 and 1020 of FIG. 10 shows a sample layout of the fields contained in seed value file and repeat sales file, respectively. Program 115 transfers seed value file and repeat sales file to UNIX portion of computer 110 for processing (steps 925 and 930).

Figure 11:
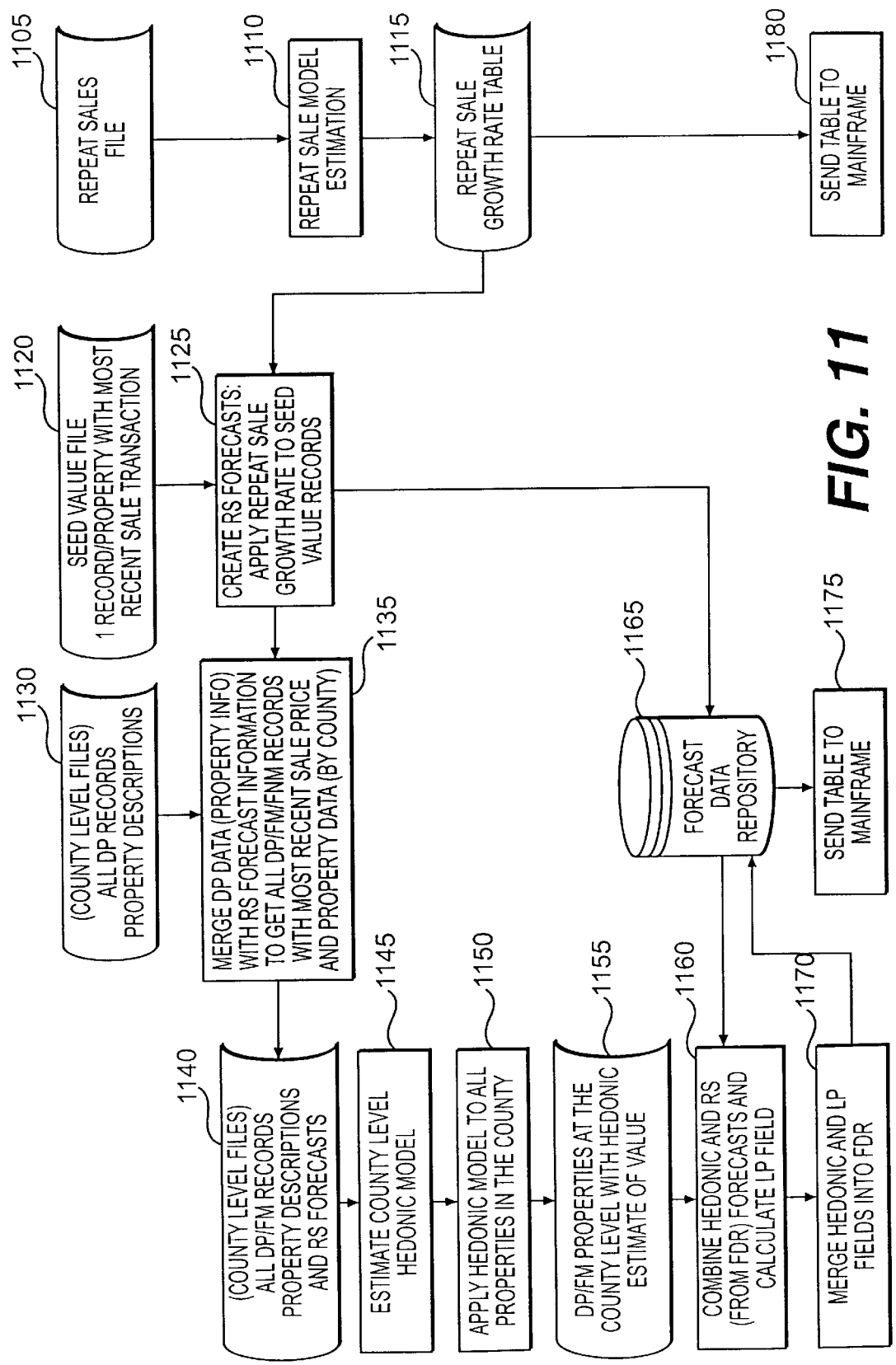
FIG. 11 is a flowchart illustrating the process for determining aggregate property is value activity by property types.

The next phase of program 115 relates to CAD (Collateral Assessment Development) processes. In one embodiment consistent with the present invention, program 115 operates on a UNIX platform with SAS software. As shown in FIG. 11, program 115 uses repeat sales file from FIG. 9 (step 1105) to run the Repeat Sales model 220 to determine aggregate property value activity (e.g., increase or decrease in value) by property types (e.g., condos vs: single-family) within zip codes and counties for a given period of time (step 1110). To do so, program 115 analyzes the repeat sales file and groups the records by property type for each unique zip code and county. Program 115 then calculates the aggregate appreciation/depreciation in property value for the grouped sample. Program 115 may also create plot of indices to enable visual, inspection for quality control using commercial software such as MathSoft's S-Plus. Program 115 then produces a GRT (Growth Rate Table) or GMT (Growth Multiplier Table) by zip code 1210 and a GRT by county 1220, a sample layout of which are illustrated in, FIG. 12 (step 1115). GRT 1210 and 1220, in conjunction with a property's seed value, provide a market-to-market value of the property within a specified period of time.

Program 115 takes GRT 1210 and 1220 and applies it to records contained in the seed value file (step 1120) to create a RS (Repeat Sales) forecast (step 1125). A detailed explanation of Repeat Sales model 210 is provided in the above-referenced related application Ser. No. 08/730,289. This step produces a seed value file with estimated current value based on repeat sales.

Program 115 also takes county-specific versions of the scrubbed property flat file (step 1130) and merges the DP (Data Provider) records with repeat sales forecast information (step 1135) to obtain all data provider/FM/FNM records with most recent sale price and property data, preferably by county (step 1140). Program 115 then estimates county level estimate using Hedonic model 220 (step 1145) for all properties in the above-referenced related application Ser. No. 08/730,289

Program 115 applies Hedonic model 220 to all properties in the county (step 1150) and produces a data provider/ agency properties file at the county level with hedonic estimate of value (step 1155). Program 115 then combines the file with Hedonic model 230 estimates of value with seed value file containing Repeat Sales model 220 estimated current value and generates the combined LP (Loan Prospector) estimate (step 1160). A detailed explanation of combining the results of the statistical models is provided in the above-referenced related application Ser. No. 08/730, 289 Program 115 applies previously stored forecast data records from forecast data repository 130 (step 1165) and updates forecast data repository 130 with new property value estimates (step 1170). FIG. 13 shows a table 1310 illustrating representative fields of the records stored in forecast data repository. Once the UNIX portion of computer 110 completes processing to obtain property value estimates, program 115 transmits table 1310 and GRT tables 1210 and 1220 to the mainframe portion of computer 110 for data delivery to third parties (steps 1175 and 1180).

Figure 14:
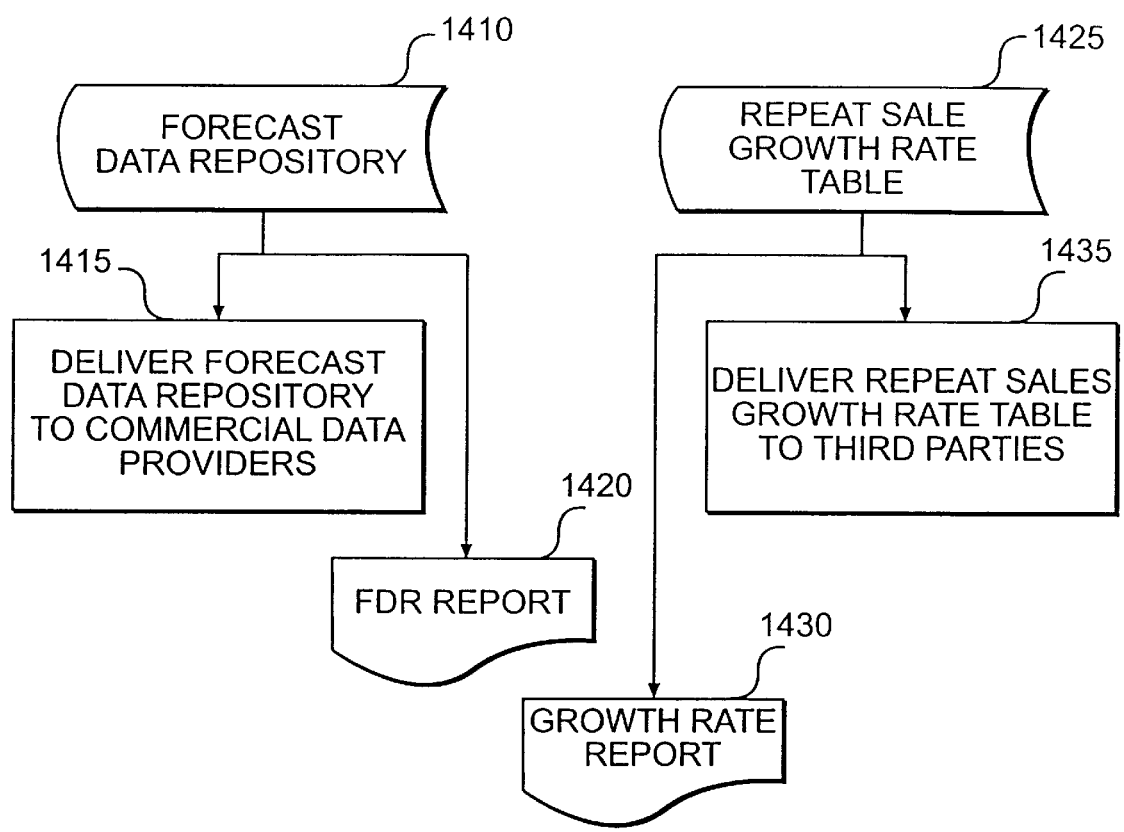
FIG. 14 is a flowchart illustrating data delivery to third parties.

As shown in FIG. 14, records stored in forecast data repository 130 (step 1410) may be delivered to commercial data providers (step 1415) or be used to generate a report for a specific property (step 1420). GRT tables 1210 and 1220 (step 1425) can also be used to generate a growth rate report (step 1430) or be delivered to third parties (step 1435).

Users at user terminal 140 can now immediately access property value estimates by entering the input information of the property to be estimated. Once program 115 receives a request from user terminal 140, program 115 can access the preprocessed property value estimate and display the results in an output screen such as one shown in FIG. 6.

Conclusion

Systems and methods consistent with the present invention improve the efficiency of estimates of value for real estate entities by preprocessing the estimates and storing them for later access. Such systems and methods periodically process estimates of property value and store the estimates in a central repository. The central repository is periodically updated with new and revised property estimates.

It will be apparent to those skilled in the art that various modifications and variations can be made in the systems and methods of the present invention without departing from the scope or spirit of the invention. Other embodiments of the invention will be apparent to those skilled in the art from consideration of the specification and practice of the invention disclosed herein. It is intended that the specification and examples be considered as exemplary only, with the true scope and spirit of the invention indicated by the following claims.

What is claimed is:

1. A method of preprocessing property value estimates for a group of substantially all properties in a predefined area comprising the steps, performed by a data processor, of:

accessing, from a database containing property data, a set of property data corresponding to each property in the group;

determining a property price estimate for each of the properties in the group as a function of the set of corresponding property data: and storing each of the determined property price estimates indexed to the corresponding properties in a forecast data repository as a predetermined property price estimate for each property in the group, wherein the accessing, determining, and storing occur according to a predetermined schedule and the forecast data repository is made available for users to obtain the predetermined property price estimates.

2. The method of claim 1, wherein the determining step includes the substeps of:

computing a first property price estimate for each property using a first predictive model.

3. The method of claim 1, further comprising the step of:

retrieving at least one predetermined property price estimate corresponding to a property in the group for use in an economic decision.

4. The method of claim 3, wherein the economic decision comprises a decision whether to purchase the property.

5. The method of claim 3, wherein the economic decision comprises a decision whether to sell the property.

6. The method of claim 3, wherein the economic decision comprises a decision whether to rely upon an appraisal of the property.

7. The method of claim 3, wherein the economic decision comprises a decision whether to update an appraisal of the property.

8. The method of claim 3, wherein the economic decision comprises a decision concerning a loan secured by the property.

9. The method of claim 8, wherein the decision concerning a loan secured by the property comprises a decision whether to purchase the loan.

10. The method of claim 8, wherein the decision concerning a loan secured by the property comprises a decision whether to guard against credit risk on the loan.

11. The method of claim 8, wherein the decision concerning a loan secured by the property comprises a decision regarding a course of action when the loan is in default.

12. The method of claim 8, wherein the decision concerning a loan secured by the property comprises a decision regarding pricing the property for foreclosure sale.

13. The method of claim 3, further comprising the step of:

providing the retrieved predetermined property price estimate to a third party.

computing a second property price estimate for each property using a second predictive model; and computing the property price estimate based on at least the first property price estimate and the second property rice estimate.

14. The method of claim 13, further comprising the step of:

receiving remuneration from the third party.

15. The method of claim 3, further comprising the step of:

forecasting a credit loss based upon the retrieved predetermined property price estimate.

16. The method of claim 1, wherein the predefined area is a predefined geographic area.

17. The method of claim 1, wherein the determining step comprises:

determining a property price estimate for each of the properties in the group using a previous property price estimate corresponding to each of the properties in the group.

18. The method of claim 1, wherein the group of substantially all properties in a predefined area is a group of at least 500 properties.

19. The method of claim 1, wherein the predefined area is at least one of a group comprising: a county, at least two contiguous counties, a country, a 5-digit ZIPCODE, and a nine-digit ZIPCODE.

20. The method of claim 1, wherein the predetermined schedule is at least one of a group comprising: monthly, every three months, and upon occurrence of a periodic event.

21. A method of providing access to previously-computed property value estimates for a group of substantially all properties in a predefined area comprising the steps, performed by a data processor, of:

providing input information of a property for which the previously-computed property price estimate is desired;

accessing the previously-computed property price estimate corresponding to the input information from a forecast data repository containing previously-computed property price estimates for the group of substantially all properties in a predefined area; and presenting the accessed, previously-computed property price estimate corresponding to the input information.

22. The method of claim 21, further comprising the step of:

making an economic decision based on the presented, previously-computed property price estimate.

23. The method of claim 21, wherein the predefined area is a predefined geographic area.

24. The method of claim 21, further comprising:
accessing from a database, a set of property data corresponding to each property in a group of substantially all properties in a predefined area;
determining a property price estimate for each property in the group as a function of the set of corresponding property data; and
storing, the determined property price estimate indexed to the corresponding property in the forecast data repository as previously-computed property price estimates.

25. A system for preprocessing property value estimates for a group of substantially all properties in a predefined area comprising:
means for accessing a set of property data corresponding to each property in the group from a database containing property data for the
determining a property price estimate for each of the properties in the group as a function of the set of corresponding property data; and
means for storing each of the determined property price estimates indexed to the corresponding property in a forecast data repository as a predetermined property price estimate for each property in the group,
wherein the accessing, determining, and storing stops occur according to a predetermined schedule and the forecast data repository is made available for users to obtain the predetermined property price estimates.

26. The system of claim 25, wherein the computing determining means includes:
means for computing a first property price estimate for each property using a first predictive model;
means for computing a second property price estimate for each property using a second predictive model; and
means for computing the property price estimate based on at least the first property price estimate and the second property price estimate.

27. The system of claim 25, further comprising:
means for retrieving at least one stored predetermined property price estimate corresponding to a property in the group for use in an economic decision.

28. The system of claim wherein the economic decision comprises a decision whether to purchase the property.

29. The system of claim 27, wherein the economic decision comprises a decision whether to sell the property.

30. The system of claim 27, wherein the economic decision comprises a decision whether to rely upon an appraisal of the property.

31. The system of claim 27, wherein the economic decision comprises a decision whether to update an appraisal of the property.

32. The system of claim 27, wherein the economic decision comprises a decision concerning a loan secured by the property.

33. The system of claim 32, wherein the decision concerning a loan secured by the property comprises a decision whether to purchase the loan.

34. The system of claim 32, wherein the decision concerning a loan secured by the property comprises a decision whether to guard against credit risk on the loan.

35. The system of claim 32, wherein the decision concerning a loan secured by the property comprises a decision regarding a course of action when the loan is in default.

36. The system of claim 32, wherein the decision concerning a loan secured by the property comprises a decision regarding pricing the property for foreclosure sale.

37. The system of claim 27, further comprising:
means for providing the retrieved predetermined property price estimate to a third party.

38. The system of claim 37, further comprising:
means for receiving remuneration from the third party.

39. The system of claim 25, wherein the predefined area is a predefined geographic area.

40. A system for providing access to previously-computed property value estimates group of substantially all properties in a predefined area comprising:
means for providing input information of a property for which the previously computed property price estimate is desired;
means for accessing the previously-computed property price estimate corresponding to the input information from a forecast data repository containing previously-computed property price estimates for the group of substantially all properties in a predefined area; and
means for presenting the accessed previously-computed property price estimate corresponding to the input information.

41. The system of claim 40, further comprising:
means for performing an economic analysis based on the presented, previously-computed property price estimate.

42. The system of claim 40, wherein the predefined area is a predefined geographic area.

43. The system of claim 40, further comprising:
means for accessing from a database, a set of property data for each property in the group of substantially all properties in a predefined area;
means for determining a property price estimate for each property in the group as a function of the set of corresponding property data; and
means for storing, the computed determined property price estimate indexed to the corresponding property in the forecast data repository as a previously-computed property price estimate.

44. An article of manufacture capable of configuring a data processor to preprocess property value estimates for a group of substantially all properties in a predefined area, the article comprising program code to cause the data processor to perform the steps of:
accessing, from a database containing property data, a set of property data corresponding to each of the properties in the group;
determining a property price estimate for each of the properties in the group as a function of the set of corresponding property data; and
storing each of the computed determined property price estimates indexed to the corresponding properties in a forecast data repository as a predetermined property price estimate for each property in the group,
wherein the accessing, determining, and storing stops occur according to a predetermined schedule and the forecast data repository is made available for users to obtain the predetermined property Price estimates.

45. The article of manufacture of claim 44, further comprising program code to perform the step of:
retrieving at least one stored predetermined property price estimate corresponding to a Property in the group for use in an economic decision.

46. The article of manufacture of claim 45, wherein the economic decision comprises a decision concerning a loan secured by the property.

47. The article of manufacture of claim 45, further comprising program code to perform the step of:

providing the retrieved predetermined property price estimate to a third party.

48. The article of manufacture of claim 47, further comprising program code to perform the step of:

receiving remuneration from the third party.

49. The article of manufacture of claim 44, wherein the predefined area is a predefined geographic area.

50. An article of manufacture capable of configuring a data processor to provide access to previously-computed property estimates for a group of substantially all properties in a predefined area, the article comprising program code to cause the data processor to perform the steps of:

providing input information of a property for which the previously-computed property price estimate is desired;

accessing the previously-computed property price estimate corresponding to the input information from a forecast data repository containing previously-computed property price estimates for the group of substantially all properties in a predefined area; and presenting the accessed previously-computed property price estimate corresponding to the input information.

51. The article of manufacture of claim 50, wherein the program code to perform the step of presenting the accessed preprocessed property price estimate includes program code to perform the step of:

performing an economic analysis based on the presented, previously-computed property price estimate.

52. The article of manufacture of claim 50, wherein the predefined area is a predefined geographic area.

53. The article of manufacture of claim 50, where the data processor is further configured to perform the steps of:

accessing from a database, a set of property data for each property in the group of substantially all properties in a predefined area;

means for determining a property price estimate for each property in the group as a function of the set of corresponding Property data; and storing, the determined property price estimate indexed to the corresponding property in the forecast data repository as a previously-computed property price estimate.

54. An article of manufacture storing preprocessed property estimates for a group of substantially all properties in a predefined area computed by a method comprising the steps of:

accessing, from a database containing property data for the group of substantially all properties in a predefined area, a set of property data corresponding to each of the properties;

determining a property price estimate for each of the properties in the group as a function of the set of corresponding property data; and storing the determined property price estimates indexed to the corresponding properties in a forecast data repository as predetermined property price estimates, wherein the accessing, determining, and storing occur according to a predetermined schedule and the forecast data repository is made available for users to obtain the preprocessed property price estimates.

55. The article of manufacture of claim 54, wherein the method further comprises the step of:

retrieving at least one stored predetermined property price estimate for use in an economic decision.

56. The article of manufacture of claim 54, wherein the is redefined area is a predefined geographic area.

* * * * *

UNITED STATES PATENT AND TRADEMARK OFFICE
CERTIFICATE OF CORRECTION

PATENT NO.   : 6,842,738 B1
DATED        : January 11, 2005
INVENTOR(S)  : Michael G. Bradley et al.

It is certified that error appears in the above-identified patent and that said Letters Patent is hereby corrected as shown below:

Column 7,
Line 40, "data: and" should read -- data; and --.
Line 53, "model." should read -- model;
    computing a second property price estimate for each property using a second predictive model; and
    computing the property price estimate based on at least the first property price estimate and the second property price estimate. --.

Column 8,
Delete lines 19-23 in their entirety.
Line 53, following "of:" insert
    -- determining a property price estimate for each of the properties in the group as a function of a set of property data corresponding to each property in the group;
    storing each of the determined property price estimates indexed to the corresponding properties in a forecast data repository as a predetermined property price estimate for each property in the group; --.
Line 58, "from a" should read -- from the --.

Column 9,
Line 4, "database, a" should read -- database a --.
Line 10, "storing, the" should read -- storing the --.
Line 18, "data for the" should read -- data; --
Line 26, delete "stops".
Line 30, delete "computing".
Line 43, "claim wherein" should read -- claim 27, wherein --.

Column 10,
Line 9, "estimates group" should read -- estimates for a group --.
Line 10, following "comprising:" insert
    -- means for determining a property price estimate for each of the properties in the group as a function of a set of property data corresponding to each property in the group;
    means for storing each fo the determined property price estimates indexed to the corresponding properties in a forecast data repository as a predetermined property price estimate for each property in the group; --.
Line 12, "previously computed" should read -- previously-computed --.
Line 17, "from a" should read -- from the --
Line 20, "accessed previously-computed" should read -- accessed, previously-computed --.

UNITED STATES PATENT AND TRADEMARK OFFICE
CERTIFICATE OF CORRECTION

PATENT NO. : 6,842,738 B1
DATED : January 11, 2005
INVENTOR(S) : Michael G. Bradley et al.

It is certified that error appears in the above-identified patent and that said Letters Patent is hereby corrected as shown below:

Column 10 (cont'd),
Line 30, "database, a" should read -- database a --.
Line 36, "storing, the computed determined" should read -- storing the determined --.
Line 52, delete "computed".
Line 56, delete "stops".
Line 59, "Price" should read -- price --.
Line 63, "Property" should read -- property --.

Column 11,
Line 12, "property estimates" should read -- property value estimates --.
Line 14, following "of:" insert
    -- determining a property price estimate for each of the properties in the group as a function of a set of property data corresponding to each property in the group;
    storing each of the determined property price estimates indexed to the corresponding properties in a forecast data repository as a predetermined property price estimate for each property in the group; --.
Line 20, "from a" should read -- from the --.
Line 24, "accessed previously-computed" should read -- accessed, previously-computed --.

Column 12,
Line 1, "database, a" should read -- database a --.
Line 6, "Property" should read -- property --.
Line 7, "storing, the" should read -- storing the --.
Lines 32-33, "the is redefined" should read -- the predefined --.

Signed and Sealed this

Fifth Day of April, 2005

JON W. DUDAS
*Director of the United States Patent and Trademark Office*